Figure 1:
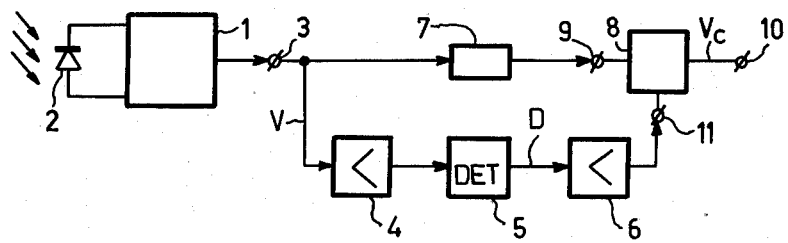

United States Patent [19]
Eisema

[11] 3,989,893
[45] Nov. 2, 1976

[54] REPRODUCING APPARATUS WITH DROP OUT SUPPRESSION CIRCUIT FOR AUDIO AND VIDEO SIGNALS

[75] Inventor: Hendrik Eisema, Eindhoven, Netherlands

[73] Assignee: U.S. Philips Corporation, New York, N.Y.

[22] Filed: Dec. 4, 1974

[21] Appl. No.: 529,338

[30] Foreign Application Priority Data
Sept. 13, 1974 Netherlands .................... 7412152

[52] U.S. Cl. ........................... 178/6.6 DC; 360/38; 360/19
[51] Int. Cl.² ........................................... H04N 5/60
[58] Field of Search ........... 360/38, 19; 178/6.6 DC, 178/6.6 R, 6.7 A, 5.6; 179/100.3 V

[56] References Cited
UNITED STATES PATENTS

| | | | |
|---|---|---|---|
| 3,309,460 | 3/1967 | Rank | 360/38 |
| 3,408,457 | 10/1968 | Boylan | 178/6.6 DC |
| 3,446,914 | 5/1969 | Hodge | 360/19 |
| 3,824,620 | 7/1974 | Langer | 360/38 |

OTHER PUBLICATIONS
"Signal processing in the Philips 'VLP' system" by den Bussche et al.; Philips Tech. Rev. 33, pp. 181–185; 1973, No. 7.

*Primary Examiner*—Bernard Konick
*Assistant Examiner*—Alan Faber
*Attorney, Agent, or Firm*—Frank R. Trifari; Simon L. Cohen

[57] ABSTRACT

An apparatus for reading a record carrier on which a combined video signal is recorded in a single track, in particular a disc-shaped record carrier on which the signal is recorded in optically coded form. In order to reduce the disturbing effect of dropouts on the eventually obtained sound signal, a portion of the the video signal is subjected to the action of a clamping circuit. Said clamping circuit normally transfers the applied modulated video signal unmodified. During a dropout the modulated video signal consisting of the modulated sound and pilot signal is clamped at its average value by means of said clamping circuit, so that a substantial improvement is obtained in respect of the sound signal. Thus, the length of time of sound signal clamping is minimized and the sound quality is improved.

7 Claims, 5 Drawing Figures

REPRODUCING APPARATUS WITH DROP OUT SUPPRESSION CIRCUIT FOR AUDIO AND VIDEO SIGNALS

The invention relates to an apparatus for reading a record carrier, in particular a disc-shaped record carrier, which record carrier contains a signal, recorded in optically coded form, which is read with the aid of a beam of radiation and a light-sensitive detector, and which comprises a combined video signal comprising a first signal component which consists of a first carrier wave which is modulated with the luminance information, and at least a second signal component which contains sound information as a modulation of a second carrier wave.

Consequently, the invention concerns the reading of record carriers on which the luminance information, normally provided with synchronizing signals, the sound information and, as the case may be, chrominance information are stored in a single common track, in particular in an optically coded manner. In this respect, first of all a disc-shaped record carrier is considered as for example proposed in U.S. Patent application Ser. No. 229,285, filed Feb. 25, 1972, and now abandoned in favor of continuation application Ser. No. 396,399, filed Sept. 12, 1973 now abandoned which has been laid open for public inspection, in which carrier the information is recorded in relief, i.e. in a sequence of recesses and intermediate areas. When such a structure is read with the aid of a beam of radiation and a single light detector, a signal is obtained which consists of a certain d.c. component, which corresponds to the average light level, and an a.c. component superimposed thereon, which component contains the information which is read from the record carrier.

During said reading operation problems occur owing to irregularities in the structure of the record carrier. Said irregularities may for example consist in the absence of one or more of the said recesses or the presence of inhomogeneities in the carrier, such as air bubbles etc. Said irregularities in the record carrier, but also disturbances in reading said record carrier, give rise to signal deviations in the signal which is supplied by the light detector, which signal may even become zero if the beam of radiation is interrupted completely. All these signal disturbances will be referred to as "dropouts" hereinafter.

In order to reduce the effect of said dropouts on the eventually reproduced image a multitude of compensation circuits are known. Said known compensation circuits are generally based on the fact that a television picture has a line-frequency structure and that the content of said television picture differs little from line to line. By delaying the luminance and/or chrominance signal by one line time it is therefore possible to utilize the signal that has been delayed by one line time instead of the disturbed signal during the occurrence of a dropout in the detected video signal, so that the effect of said dropout on the reproduced image is reduced to a reasonable extent.

However, said method cannot be used for the sound information, because said sound information does not have said line-frequency structure. Consequently, dropouts remain fully disturbing in the reproduced sound signal.

Therefore, it is an object of the invention to mitigate the effect of dropouts on the reproduced sound signal in a particularly simple manner. For this, the invention is characterized in that the apparatus is provided with a dropout detector for the detection of dropouts in the signal which is read from the record carrier, and with a clamping circuit with a signal input, a signal output and a control input, which clamping circuit receives a control signal from the dropout detector at its control input and as a function of said control signal normally transfers the signal applied to its signal input unmodified to the signal output and during the occurrence of a dropout in response to the control signal which is then present at its control input clamps said signal output at a fixed signal value which corresponds to the average value of the signal which is applied to its signal input, and in which at least the second signal component is subjected to the action of said clamping circuit.

The step according to the invention does not provide complete compensation of dropouts, but it has been found that owing to said step the energy content of a signal disturbance which occurs in the time interval of a dropout is reduced in such a way that the disturbance which occurs in the eventually reproduced sound signal remains within acceptable limits.

Preferably, the combined video signal is subjected to the action of the clamping circuit. Said embodiment of the apparatus according to the invention, compared with all other embodiments that are possible, has the advantage that the time during which the clamping circuit should be active during the occurrence of a dropout is minimal. Because the second signal component, which contains the sound information, generally covers a frequency band below the frequency band which is occupied by the first signal component, it is necessary to employ low-pass filters or band-pass filters for extracting said second signal component. However, owing to the use of this type of filters a dropout of a certain duration in the combined video signal will appear as a dropout of a longer duration in the extracted second signal component. The extent to which said duration is prolonged naturally depends on the filters used.

Therefore, if the extracted second signal component is subjected to the action of the clamping circuit, said clamping circuit in the event of a dropout will have to clamp its signal output at said fixed signal value for a time which is longer than the duration of the original dropout. Although this is still acceptable in most cases, it will be obvious that it is more favorable when the time during which the clamping circuit clamps the signal which is subject to its action at a fixed signal value during the occurrence of a dropout is minimal. This is achieved by subjecting the combined video signal to the action of said clamping circuit, because said video signal has not yet been subjected to a filter action and the duration of the signal disturbances caused by the dropouts has not yet been extended.

For the detection of the dropouts the complete combined video signal may be applied to the dropout detector. The embodiment and the operation of said dropout detector is irrelevant for the principle of the invention. In principle, any known dropout detector may be employed. However, since the apparatus according to the invention does not compensate for dropouts, but reduces their influence on the eventually reproduced sound signal, there will generally be little need to detect comparatively small dropouts. Therefore, the dropout detector may conveniently be of a type which only detects larger dropouts, for example a so-called peak detector which detects the time intervals during which the applied signal exceeds a certain preset amplitude margin. In that case it may be useful to apply not the complete combined video signal, but the extracted first signal component to the dropout detector. Said first signal component generally consists of a frequency modulated first carrier wave and then has an essentially constant amplitude. It is therefore possible to determine the amplitude limit for the dropout detector which functions as a peak detector fairly accurately, so that an effective dropout detection is obtained.

Figure 2:
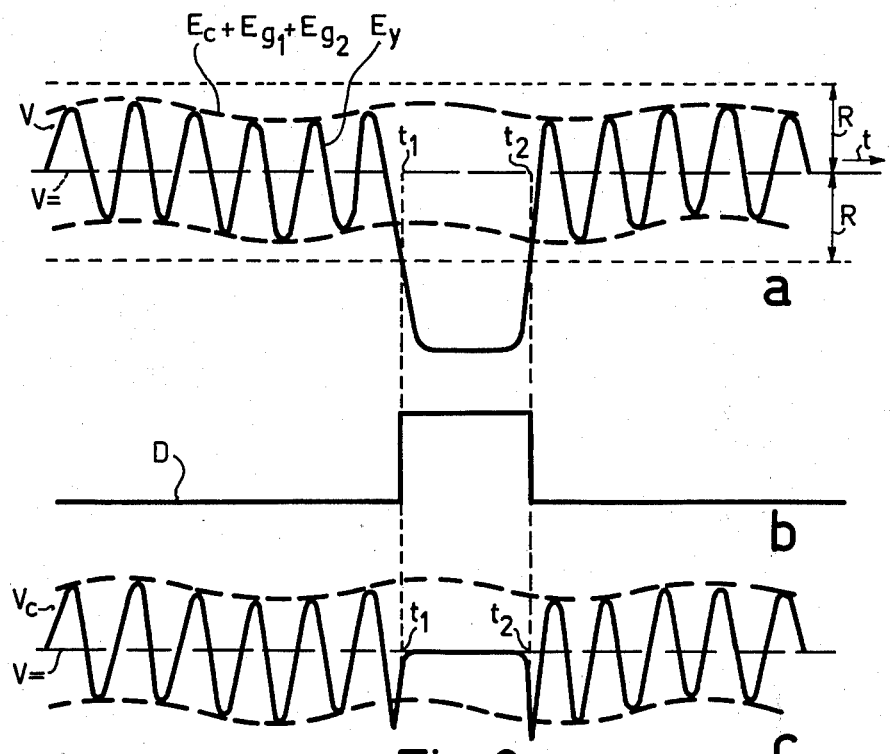
Figure 3:
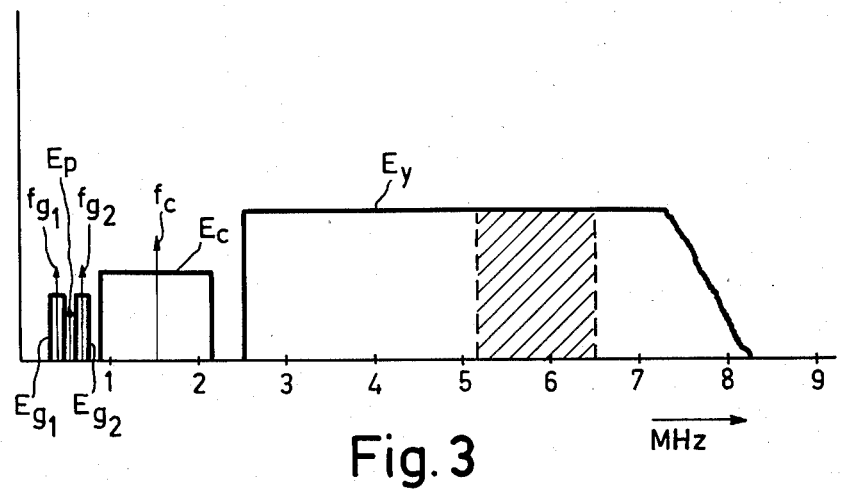
Figure 4:
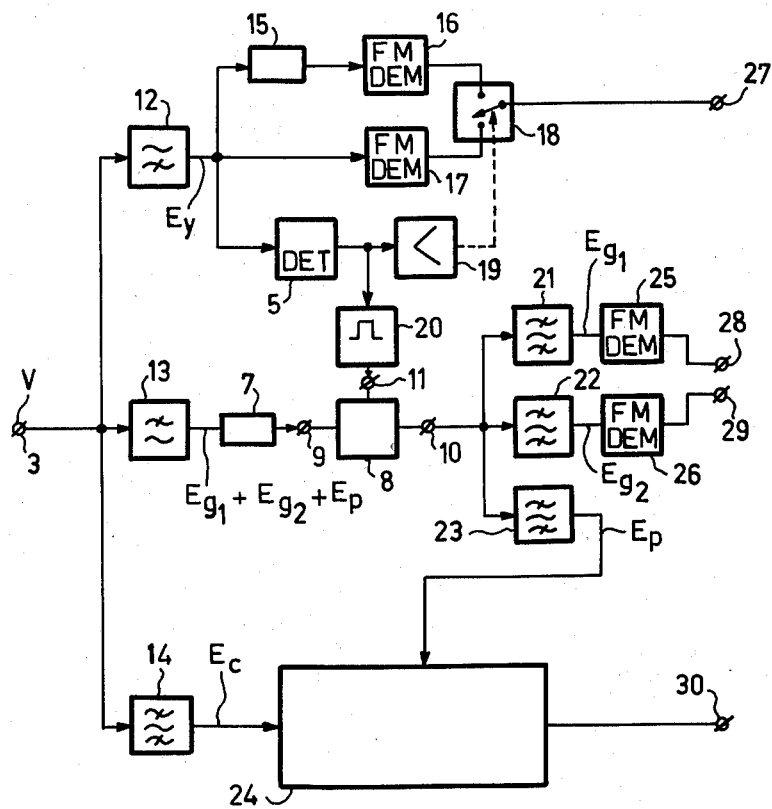

The invention will be explained hereinafter with reference to the drawing, in which FIG. 1 shows a first embodiment of the apparatus according to the invention, FIG. 2 shows some waveforms for illustration purposes, and FIG. 3 by way of illustration shows an example of a frequency spectrum of a combined video signal, while FIG. 4 shows a second embodiment of the apparatus according to the invention.

Figure 5:
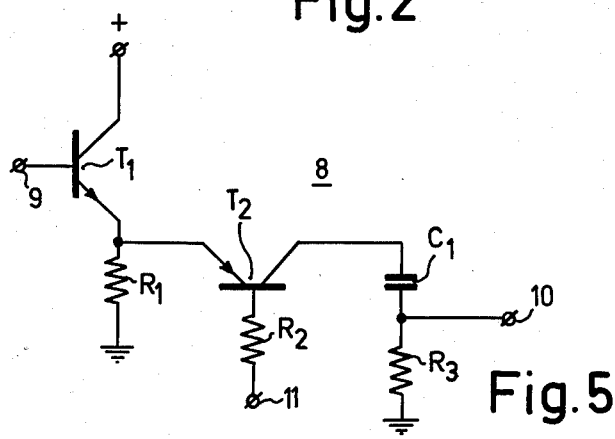

FIG. 5 by way of example shows an embodiment of the clamping circuit 8.

The embodiment of the apparatus according to the invention shown in FIG. 1 comprises a read unit 1 for the combined video signal. It is assumed that in the present case an optical read system is used, which is represented by a light-sensitive diode 2. As the construction and operation of the read system are not essential for the principle of the invention said read system is only shown schematically. At the output terminal 3 of the read unit 1, which terminal is also the input terminal for the following signal processing circuit, the combined video signal V is consequently available.

Said combined video signal V by way of example may be as shown in FIG. 2a and have a frequency spectrum as shown in FIG. 3. As is indicated in FIG. 3 the luminance information is frequency modulated on a first carrier wave, so that the luminance information covers the frequency band $E_y$. It is assumed that the modulated first carrier wave has a frequency sweep which extends from 5.2 MHz, which corresponds to maximum black, to 6.5 MHz which corresponds to maximum white (shaded area). As for a correct signal transmission at least the first lower side band should be included, the spectrum of the luminance information $E_y$ extends down to 2.5 MHz at the lower frequency end for a luminance bandwidth of 2.7 MHz.

The chrominance information of the color television signal is contained in a frequency band $E_c$ below the frequency band $E_y$, namely as a modulation of a carrier wave $f_c$. This may be achieved in known manner by transposing the chrominance signal present in the standard color television signal to a lower frequency by mixing it with a suitable mixing frequency. In the Figure the frequency of 1.5 MHz is selected for the carrier wave $f_c$, while the bandwidth of the chrominance signal is 1.2 MHz.

Below the frequency band $E_c$ two sound signals are included as frequency modulations of two carrier waves $f_{g1}$ and $f_{g2}$, which sound signals occupy the frequency bands $E_{g1}$ and $E_{g2}$. Said two frequency bands may for example contain a stereo sound signal which is added to the color television signal. Moreover, between said two frequency bands $E_{g1}$ and $E_{g2}$ a pilot signal $E_p$ is included, which in known manner may be employed to eliminate phase errors owing to speed variations of the record carrier when the chrominance signal $E_c$ is retransposed to the standard chrominance carrier frequency associated with the standard color television signal. The exact position of said pilot signal $E_p$ relative to the two sound signals $E_{g1}$ and $E_{g2}$ is of no further interest.

The combination of the signal components $E_y$, $E_c$, $E_{g1}$, $E_{g2}$ and $E_p$ to one combined video signal may be effected in a manner as described in the U.S. Pat. No. 3,893,163. The signal components $E_c$, $E_{g1}$, $E_{g2}$ and $E_p$ are then added to the signal component $E_y$, after which the combined signal is limited. Thus, a signal is recorded on the record carrier which has only two possible signal values, which allows a favorable recording. When such a signal is read a waveform as shown in FIG. 2a is obtained. The signal V obtained after reading comprises the first signal component $E_y$, which consists of a frequency modulated first carrier wave on which the signals of a lower frequency $E_c$, $E_{g1}$, $E_{g2}$ and $E_p$ are superimposed. Said signals ($E_c+E_{g1}+E_{g2}+E_p$) which are superimposed on the signal component $E_y$ generally have a comparatively low amplitude (for example maximum 20 percent relative to the amplitude of the first signal component $E_y$. When reading is effected by means of a single diode 2, said signal components are superimposed on a d.c. component $V_=$, which corresponds to the average light energy at the diode. When said signal is amplified, employing a.c. coupling between consecutive amplifiers, said d.c. component obviously becomes nil.

It has been assumed that in the time interval $t_1-t_2$ a dropout occurs. In the case of a disc-shaped record carrier which is read with the aid of an optical read system such a dropout may for example be caused by a surface flaw, by the absence of one or more recesses or by an irregularity in the record carrier, for example an air bubble. The read detector, in this case the light-sensitive diode 2, will then receive a deviating amount of light, the magnitude of the deviation of course depending on the magnitude and nature of the flaw and/or irregularity. It has been assumed that the disturbance is such that the video signal V supplied by the read system 1 assumes a value which deviates substantially from the signal values normally assumed by said video signal. It will be evident that if said video signal is not further processed there will also appear a signal disturbance in the individual signals $E_y$, $E_c$, $E_{g1}$, $E_{g2}$ and $E_p$, which disturbance begins at the instant $t_1$.

As stated previously a compensation of said signal disturbances with respect to the luminance signal and the chrominance signal can be achieved by utilizing the line-frequency structure of a television picture, for which purpose during a signal disturbance by means of a delay line the information contained in the preceding line is used to replace the disturbed information of the instantaneous line. However, said method cannot be used for the sound information, so that the dropout remains very disturbing in the reproduced sound.

In order to improve this, the video signal V in the apparatus according to the invention which is shown in FIG. 1 is applied to the signal input 9 of a clamping circuit 8 via a delay means 7. Further, said video signal V is applied via an amplifier 4 to a dropout detector 5, whose output signal D via an amplifier 6 is fed to a control input 11 of the clamping circuit 8. The video signal $V_c$ which has been processed by said clamping circuit is eventually available at a signal output 10 of said clamping circuit.

The operation of said circuit is as follows. The dropout detector 5 detects the appearance of the dropout at the instant $t_1$. For this, said dropout detector 5 may be of any arbitrary known design. A known embodiment of such a dropout detector is constituted by a peak detector. Such a peak detector detects the time intervals within which the amplitude of the applied signal exceeds a certain value. In order to detect both dropouts which cause a negative spurious pulse, as is the case in FIG. 2a, and dropouts which cause a positive spurious pulse, it is evident that said peak detector should be of the fullwave type (or absolute value-type). By way of illustration two threshold values are indicated in FIG. 2a by means of dotted lines, which are disposed at a distance R above and a distance R below the average value $V_=$ of the video signal V, assuming that the detection circuit supplies a detection pulse when the signal V exceeds the margin $V_= \pm R$ defined by said threshold values which margin is generally $\pm R$, because after the amplifiers $V_=$ has generally become nil. It will be evident that for a correct dropout detection the two said threshold values should lie beyond the signal spacing normally occupied by the video signal V.

As previously stated, the dropout detector 5 when thus designed each time supplies a pulse-shaped output signal D when and as long as the applied video signal V assumes a value which lies beyond the signal spacing $V_= \pm R$. Said output signal D, shown in FIG. 2b, of the dropout detector 5 is applied to the control input 11 of the clamping circuit 8 via the amplifier 6. Said clamping circuit 8 is designed so that normally the video signal which is applied to its signal input 9 is transferred (unimpeded) to its signal output 10, but that in the event of a control pulse at its control input 11 said signal output 10 is clamped at a signal value which corresponds to the average value $V_=$ of the applied video signal V. The video signal $V_c$ at the signal output 10 of the clamping circuit 8 therefore will be as shown in FIG. 2c.

Instead of an arbitrary signal disturbance in the time interval $t_1-t_2$, as shown in FIG. 2a, said video signal $V_c$ now contains a signal disturbance during said time interval, which is constituted by the video signal $V_c$ remaining at a constant value $V_=$ during said time interval. It has been found that said residual signal disturbance is far less disturbing than the original signal disturbance. This is explicable because the energy contents of the residual signal disturbance is substantially lower than the energy contents of the original signal disturbance. In particular with respect to the sound signals which are eventually obtained this yields a substantial improvement. When said sound signals are extracted, use is made of filters which may readily be brought into a resonant mode, though damped, by a signal disturbance with a relatively high energy contents. As a result of this, the eventually obtained sound signal is fully determined by said dropout during a time interval which may be substantially longer than the time interval of the original dropout, which results in a clearly audible disturbance of the sound signal.

The step according to the invention, which results in a limitation of the energy contents of the signal disturbance first of all ensures that the magnitude of the disturbance in the eventually reproduced sound signal is limited. Moreover, the time is reduced within which said signal disturbances in the sound signal have a value within the audible range, because the filters are excited less strongly and the disturbance sooner decreases to a non-disturbing value owing to decay. In this respect both aspects are significant because the disturbing effect of a signal disturbance in the reproduced sound signal depends both on the magnitude of said disturbance and on its duration. Signal disturbances in the eventual sound signal which have a duration below one or a few microseconds are for example hardly audible anymore.

The delay means 7 should provide a delay which corresponds to the delay caused by the amplifiers 4 and 6 and the detector 5, so that the input signal at the signal input 9 and the control signal at the control input 11 of the clamping circuit are in agreement with respect to time. Said time delay has already been allowed for in FIG. 2, so that the pulse of the detector signal D covers the time interval $t_1-t_2$.

FIG. 4 shows a second embodiment of the apparatus according to the invention, in which corresponding elements are denoted by the same reference numerals as in FIG. 1. The combined video signal V is again applied to an input terminal 3. Connected to said input terminal 3 are a high-pass filter 12 for extracting the luminance signal $E_y$, a low-pass filter 13 for extracting the two sound signals $E_{g1}$ and $E_{g2}$ and the pilot signal $E_p$, and a band-pass filter 14 for extracting the chrominance signal $E_c$.

The luminance signal is demodulated with the aid of an FM demodulator 17. Moreover, said luminance signal $E_y$ is delayed by one line time by a delay means 15, for example an ultrasonic delay line, and subsequently demodulated with the aid of an FM demodulator 16. Said delayed and undelayed demodulated luminance signal are applied to the two inputs of a switch 18, which via an amplifier 19 is actuated by the dropout detector 5, which detects dropouts in the extracted luminance signal $E_y$. In this known manner a compensation of dropouts in the luminance signal is achieved, which luminance signal is available at the output terminal 27.

The extracted sound signals $E_{g1}$ and $E_{g2}$ together with the pilot signal $E_p$ are applied to the signal input 9 of the clamping circuit 8 via the delay means 7. Said clamping circuit 8 receives a control signal from the dropout detector 5 at its control input 11 via a pulse shaper 20. Thus, a signal appears at the signal output 10 of the clamping circuit 8, which signal is clamped at its average valve during a dropout. As the sound signals $E_{g1}$ and $E_{g2}$ together with the pilot signal $E_p$ have already been subjected to the filter action of the low-pass filter 13, the duration of the dropout in the signal which is applied to the clamping circuit 8 is generally longer than the duration of the dropout in the original combined video signal V and is also longer than the duration of the dropout in the extracted luminance signal $E_y$. The dropout which is detected by the dropout detector 5 consequently has a duration which is not in accordance with the dropout in the sound signals. Yet, in order to obtain a clamping action of the clamping circuit 8 for the full duration of the dropouts, the shown pulse shaper 20 is provided. Said pulse shaper may be designed so that it supplies a pulse of a fixed duration as soon as a pulse appears at the output of the dropout detector 5. The pulse duration of the pulse which is supplied by the pulse shaper 20 should then be selected so that at least the majority of at least the gross part of the dropouts in the sound signals is fully covered by said pulse. On the other hand, it will be attempted to minimize said pulse duration so as not to affect correct portions of the sound signals. In this respect, it is therefore necessary to compromise between a high degree of dropout limitation, also of dropouts of very long duration, and minimal impairment of correct signal portions. The eventual choice then depends of course on the type of dropout which occurs in the detected video signal, i.e. inter alia on the type of record carrier and the method of reading.

The corrected signal at the signal output 10 of the clamping circuit is split up by means of filters 21, 22 and 23 into the sound signals $E_{g1}$ and $E_{g2}$ and the pilot signal $E_p$. The two sound signals $E_{g1}$ and $E_{g2}$ are demodulated with the aid of FM-demodulators 25 and 26 and are available at the output terminals 28 and 29. The extracted pilot signal $E_p$ is employed, in known manner, for the compensation of phase errors in the chrominance signal, for example as described in U.S. Pat. No. 3,580,990. The chrominance signal $E_c$ which is extracted with the aid of the bandpass filter 14 is transposed to the standard chrominance band via the transposing means 24, which may be of any known type, and is available at output terminal 30.

FIG. 5 by way of example shows an embodiment of the clamping circuit 8. However, it will be evident that the scope of the invention is by no means limited to said embodiment. In the embodiment shown the signal input 9 of the clamping circuit 8 is connected to the base of an npn transistor $T_1$ which functions as an emitter follower, which transistor has an emitter resistor $R_1$. The emitter of said transistor $T_1$ is connected to the emitter of a pnp-transistor $T_2$, whose base via a resistor $R_2$ is connected to the control input 11 of the clamping circuit. The collector of said transistor $T_2$ is connected to the series connection of the capacitor $C_1$ and resistor $R_3$, whose connection point constitutes the signal output 10 of the clamping circuit. When transistor $T_2$ conducts the video signal which is applied to the signal input 9 is transferred to the signal output 10. However, when transistor $T_2$ is cut off by a control signal at terminal 11, the signal output assumes a potential which equals the potential level to which the resistor $R_3$ is connected. In this case it is assumed that the average value of the applied video signal is nil, which is usually so, so that the resistor $R_3$ is connected to earth.

Although so far only the reduction of the influence of dropouts on the sound signals has been mentioned, the apparatus of FIG. 1 may also yield an improvement of the luminance and/or chrominance signal. However, with respect to these signals there is less need for such processing, because dropout compensation circuits for said signals are known in many embodiments.

What is claimed is:

1. A dropout compensation apparatus for an apparatus for reading a disc-shaped record carrier optically encoded with a combined video signal containing a first carrier wave modulated with luminance information and a second carrier wave modulated with sound information, comprising a radiation sensitive detector means for converting radiation from said carrier into an electrical video signal, a dropout detector for providing a dropout indicator control signal, first coupling means for connecting at least part of said combined video signal to said dropout detector, controlled clamping circuit means having a signal input terminal, an output terminal and a control terminal for passing unaffected any signal on the signal input terminal of said clamping circuit means to the output terminal of said clamping circuit means in response to the absence of a dropout indicating control signal at the control terminal of said clamping circuit means and for clamping the signal on the output terminal of said clamping circuit means to the average value of the signal on the signal input terminal of said clamping circuit means in response to the presence of a dropout indicating control signal on the control terminal of said clamping circuit means, second coupling means for connecting said second modulated control signal from said dropout detector to said control terminal of said clamping circuit means, and third coupling means for connecting said second modulated carrier wave to the signal input terminal of said clamping means.

2. An apparatus as recited in claim 1, wherein said third coupling means also couples said first modulated carrier wave to the signal input terminal of said clamping means.

3. Apparatus as recited in claim 1, wherein said first coupling means comprises a filter passing only said first modulated carrier wave to said dropout detector.

4. Apparatus as recited in claim 2, wherein said first coupling means comprises a filter passing only said first modulated carrier wave to said dropout detector.

5. Apparatus as recited in claim 1, wherein said dropout detector comprises a peak detector for providing said dropout indicating control signal in response to a rise in the amplitude of the signal applied thereto exceeding a certain absolute value.

6. Apparatus as recited in claim 2, wherein said dropout detector comprises a peak detector for providing said dropout indicating control signal in response to a rise in the amplitude of the signal applied thereto exceeding a certain absolute value.

7. Apparatus as recited in claim 4, wherein said dropout detector comprises a peak detector for providing said dropout indicating control signal in response to a rise in the amplitude of the signal applied thereto exceeding a certain absolute value.

\* \* \* \* \*

UNITED STATES PATENT AND TRADEMARK OFFICE
CERTIFICATE OF CORRECTION

PATENT NO. : 3,989,893
DATED : November 2, 1976
INVENTOR(S) : HENDRIK EISEMA

It is certified that error appears in the above-identified patent and that said Letters Patent are hereby corrected as shown below:

Col. 1, line 28, delete "which has been laid open for public inspection";

Col. 4, line 23, after "percent" should be --)--;

IN THE CLAIMS

Claim 1, line 24, "second modulation" should be --dropout indicating--.

Signed and Sealed this ninth Day of August 1977

[SEAL]

Attest:

RUTH C. MASON
Attesting Officer

C. MARSHALL DANN
Commissioner of Patents and Trademarks